United States Patent Office 3,098,075
Patented July 16, 1963

3,098,075
NEW PYRAZOLO-PYRIMIDINES
Jean Druey, Riehen, Paul Schmidt, Therwil, and Kurt Eichenberger, Basel, Switzerland, assignors to Ciba Corporation, a corporation of Delaware
No Drawing. Filed May 26, 1959, Ser. No. 815,825
Claims priority, application Switzerland Feb. 10, 1956
24 Claims. (Cl. 260—256.4)

This invention relates to new pyrazolo-pyrimidines and a process for their preparation. More particularly, the invention concerns hydro-pyrazolo(3,4-d)pyrimidines having the nucleus of the formula

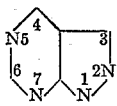

which contain in at least one of the positions 4 and 6 an oxo group and are alkylated, oxyalkylated, e.g. oxyethylated or cycloalkylated at at least one ring nitrogen atom, their tautomeric forms and salts thereof. The alkyl radicals in the new compounds are preferably of low molecular weight; such groups are e.g. methyl, ethyl, straight-chain or branched propyl, butyl, amyl or hexyl, cyclopentyl or cyclohexyl. Methyl and isopropyl radicals are particularly advantageous. Apart from the alkyl radicals at at least one ring nitrogen atom and the oxo (hydroxy) group in at least one of the positions 4 and 6, these compounds may be further substituted, for example, at one of the nitrogen atoms and/or in 4- or 6-position. The 4- or 6-position may for instance be occupied by a free or etherified hydroxyl or mercapto group, for example such a group etherified with a lower alkanol, such as methanol, ethanol or propanol, or a free or lower alkylated, e.g. methylated or ethylated amino group or halogen, such as chlorine, bromine or iodine. A ring nitrogen atom may carry for example, an aminoalkyl radical, such as a dilower alkyl-amino-lower alkyl e.g. dimethyl-, diethyl or dipropyl-amino-ethyl or propyl radical, but more especially a lower alkyl group, such as methyl, ethyl or isopropyl.

The new compounds have valuable pharmacological properties, especially a caffein-like action, and can be used as medicaments with stimulating and diuretic activity and as intermediate products for the manufacture of medicaments having such activity. Especially valuable as diuretics are hydropyrazolo(3,4-d)pyrimidines having the nucleus of the formula

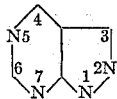

which contain in at least one of the positions 4 and 6 an oxo group and which are lower alkylated or oxyalkylated or cycloalkylated at at least two ring nitrogen atoms, and also their tautomeric forms.

Preferred are the compounds of the formula

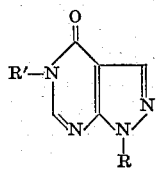

and

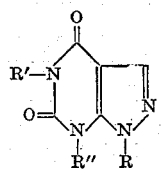

in which R—R" stand for hydrogen or lower alkyl provided that at least two of the ring nitrogen atoms are lower alkylated.

Of outstanding usefulness among these compounds are the 2,5,7-trimethyl-4,6-dioxo-4,5,6,7-tetrahydro-pyrazolo-(3,4-d)pyrimidine, the 1,5-dimethyl-4-oxo-4,5-dihydro-pyrazolo(3,4-d)-pyrimidine, and above all the 1-isopropyl-4,6 - dioxo - 5,7 - dimethyl - 4,5,6,7 - tetrahydro - pyrazolo(3,4-d)pyrimidine.

The above-mentioned new compounds are obtained by reacting together a 3-aminopyrazolo-4-carboxylic acid ester or amide with urea, isocyanates, thiourea, guanidine, formamide, or, if an amide is used, also an organic acid anhydride whereby the corresponding new 4-hydroxy-pyrazolo(3,4-d)pyrimidines are formed, which unless they already have alkyl radicals at at least one ring nitrogen atom, are N-alkylated. If alkyl- or cycloalkylisocyanates are used there may be formed carbamyl-ureas, which can be ring closed to the 5-substituted 4,6-dioxo-4,5,6,7-tetrahydro-pyrazolo(3,4-d)pyrimidines by treatment with alkaline agents.

The 3-aminopyrazole-4-carboxylic acid esters or amides may be N-unsubstituted or substituted, for example, by lower alkyl radicals.

In the preparation of the new compounds, therefore, such 3-amino-pyrazole-4-carboxylic acid esters or amides may be used as starting materials that the desired final products are directly obtained. Alternatively, there may first be formed a pyrazolo-pyrimidine lacking the desired substituents and these substituents may be introduced or formed subsequently. Thus, substituents convertible into an oxo group in the 6-position may be so converted, or a pyrazolo-pyrimidine formed, which is not alkylated at at least one ring nitrogen atom, may be treated with a reactive ester of a lower alkanol, especially of methanol, for example with a lower alkyl halide or di-lower alkyl sulfate, one or more of the ring nitrogen atoms being alkylated, depending on the reaction conditions employed. At the same time other alkylatable groups that may be present, such as e.g. mercapto or amino group, can also be alkylated.

The condensation of the aminopyrazoles to form the pyrazolo-pyrimidines is advantageously carried out at a temperature above 100° C., if desired, in the presence of a diluent and/or a condensing agent under atmospheric or superatmospheric pressure.

Substituents present in the compounds so obtained may be converted in the usual manner into other substituents or may be exchanged for hydrogen atoms provided that the final products still contain an alkyl, oxyalkyl or cycloalkyl group at at least one ring nitrogen atom and contain an oxo group in at least one of the 4- and 6-position. Thus hydroxyl or mercapto groups may be etherified or esterified, for example alkylated, e.g. methylated, for example, by treatment with the corresponding lower alkyl halides or sulfates, or may be exchanged for halogen atoms such as chlorine or bromine for example by treatment with halides or phosphoric acid. Hydroxyl groups may be exchanged for sulfur atoms for example by treatment with phosphorus pentasulfide. Free or etherified mercapto groups can be exchanged for amino or hydroxyl groups for example by reaction with ammonia, primary or secondary amines or hydrolyzing agents, respectively, halogen atoms can be exchanged for hydroxyl groups or etherified hydroxyl or mercapto groups or for amino or hydrazino groups or hydrogen by reaction with hydrolyzing agents, alcohols, mercaptans, amines, hydrazines or appropriate hydrogenating agents, respectively. It is also possible to introduce additional substituents. Non-alkylated ring nitrogen atoms, for example, can be substituted in any desired manner, above all by aminoalkyl radicals, such as the dimethylaminoethyl radical, or alkyl radicals. These subsequent reactions may be carried out in any order and combination.

A preferred embodiment of the above subsequent reaction consists in exchanging in a 6-hydroxy-5-alkyl-4-oxo-4,5-dihydro-pyrazolo(3,4-d)pyrimidine the hydroxyl group for a halogen atom in the customary manner. This is performed, for example, by treatment with a phosphoric acid halide, such as phosphorus oxychloride or pentachloride or pentabromide. The thus obtained 5-alkyl-6-halogen-4-oxo-4,5-dihydro-pyrazole(3,4-d)pyrimidines are new. They may bear substituents of any kind in the pyrazole ring. In particular, they are substituted at one of the two nitrogen atoms of the pyrazole ring by a lower alkyl group, e.g. methyl or isopropyl. The alkyl radical in the 5-position is more especially of a lower character, such as for example a methyl or ethyl group, and the halogen atom in 6-position preferably chlorine or bromine.

The new compounds have valuable properties. They have an antibacterial and antimycotic activity. More particularly they have a coronary dilatating effect. They can therefore be used as medicaments or disinfectants.

Especially valuable 6-halogen compounds are 2,5-dimethyl-4-oxo-6-chloro-4,5-dihydro-pyrazolo(3,4-d)pyrimidine, 2-isopropyl-4-oxo-5 - methyl-6-chloro-4,5 - dihydropyrazolo(3,4-d)pyrimidine, 1-isopropyl-4-oxo - 5 - ethyl-6-chloro-4,5-dihydro - pyrazolo(3,4-d)pyrimidine and 1-isopropyl-4-oxo-5 - methyl-6 - chloro-4,5 - dihydro-pyrazolo-(3,4-d)pyrimidine.

Owing to the reactivity of the halogen atom they are also important intermediates for the manufacture of medicaments. Thus they can be converted into 6-alkoxy compounds by exchanging the halogen atom in the customary manner. This is preferably carried out by treatment with an alkanol, advantageously in the presence of a strongly basic condensing agent, more especially one which is capable of forming salts with the alkanol, or with already formed alkanolates, such as alkali alkanolates or alkaline earth alkanolates. As condensing agents there come into consideration more especially alkali metals or alkaline earth metals, their amides, hydrides, alcoholates or hydrocarbon compounds.

The reaction is carried out in the usual manner in the presence or absence of a diluent, preferably at a raised temperature.

The 5-alkyl-6 - alkoxy - 4 - oxo - 4,5 - dihydro-pyrazolo (3,4-d)pyrimidines so obtained are new. They can be substituted in any way in the pyrazole ring. In particular, they carry a lower alkyl group, for example methyl or isopropyl, at one of the two nitrogen atoms of the pyrazole ring. The alkyl radical in the 5-position is more especially of a lower character, such as a methyl or ethyl group. The radical in the 6-position is particularly a lower alkoxy group, such as a methoxy group.

The new compounds have valuable pharmacological properties. They exhibit a coronary dilatating and diuretic activity and can be used as medicaments.

Especially valuable are 1,5-dimethyl-4-oxo-6-methoxy-4,5-dihydro-pyrazolo(3,4-d)pyrimidine, 1-isopropyl-4-oxo-5-methyl-6-methoxy-4,5 - dihydro-pyrazolo(3,4-d)pyrimidine, 1-isopropyl-4-oxo-5-ethyl-6-methoxy - 4,5 - dihydro-pyrazolo(3,4-d)pyrimidine, 2-isopropyl-4-oxo-5-methyl-6-methoxy-pyrazolo(3,4-d)pyrimidine and 2,5-dimethyl-4-oxo-6-methoxy-4,5-dihydro-pyrazolo(3,4-d)pyrimidine.

Depending on the substituents present in the final products they can be converted into salts. If they contain free hydroxyl, mercapto or carboxyl groups, metal salts, such as alkali metal, alkaline earth metal, or ammonium salts, can be made, for example, by dissolving the products in appropriate alkaline solutions. Compounds of basic character, such as those having basic substituents, form therapeutically useful acid addition salts with appropriate inorganic or organic acids. As salt-forming acids there may be used, for example, hydrohalic acid, sulfuric acid, phosphoric acids, nitric acid or perchloric acid; aliphatic, alicyclic, aromatic or heterocyclic carboxylic or sulfonic acids, such as formic acid, acetic acid, propionic acid, oxalic acid, succinic acid, glycollic acid, lactic acid, malic acid, tartaric acid, citric acid, ascorbic acid, oxymaleic acid, dihydroxymaleic acid, pyroracemic acid; phenyl-acetic acid, benzoic acid, para-aminobenzoic acid, anthranilic acid, para-hydroxybenzoic acid, salicylic acid or para-aminosalicylic acid; methane sulfonic acid, ethane sulfonic acid; toluene sulfonic acids, naphthalene sulfonic acids or sulfanilic acid; and methionine, tryptophane, lysine or arginine. In the process of the invention there are advantageously used starting materials which lead to the formation of the pyrazolo-pyrimidines stated above to be especially valuable.

The 3-aminopyrazoles used as starting materials and containing in the 4-position an esterified carboxyl group or the amide group can be obtained, for example, by reacting a substituted or unsubstituted α-cyano-β-oxo-propionic acid ester or nitrile or an enol-ether, acetal or mercaptal thereof, with a hydrazine. The latter is unsubstituted or mono-substituted, e.g. by an alkyl or cycloalkyl radical. As functional derivatives of α-cyano-β-oxo-propionic acid there are advantageously used enol ethers of α-cyano-β-oxo-propionic acid esters or nitriles, for example, ethoxy-methylene-cyanoacetic acid ethyl ester. The condensation to form the pyrazoles proceeds mild conditions, in part at room temperature and exothermically. It is also possible to work at a higher temperature and in the presence of a condensing agent, for example, an acid, advantageously the reactants are reacted together in the presence of a diluent, such as an alcohol, toluene or chloroform. A nitrile group in the resulting 3-amino-pyrazoles in which the substituent of the hydrazine, if any, is in the 2-position may be hydrolyzed to the amide group in the usual manner. The preparation of the starting materials is furthermore disclosed in our copending application Serial No. 637,897, now Patent No. 2,965,643, and No. 637,898, now Patent No. 2,868,803, both filed February 4, 1957. 1-alkyl-3-amino-pyrazoles of the above kind are obtained in the manner, however using a hydrazine which besides the desired substituent contains at the other nitrogen a substituent capable of being split off by hydrolysis. This substituent is then split off from the open chain intermediate formed whereupon usually under the condition of the hydrolysis, ring closure occurs.

The pyrazolo-pyrimidines described above, and their salts, or mixtures of these compounds can be used as disinfectants, stimulants, or diuretics e.g. in the form of pharmaceutical preparations. These preparations contain the aforesaid compounds in admixture with a pharmaceutical organic or inorganic carrier sutiable for enteral, parenteral or topical administration. As carriers there are used substances that do not react with the aforesaid compounds, for example, gelatine, lactose, starches, magnesium stearate, talc, vegetable oil, benzyl alcohols, gums, polyalkylene glycols, cholesterol or another carrier known for medicaments. The pharmaceutical preparations may be made up, for example, in the form of tablets, dragees or in liquid form as solutions, suspensions or emulsions. If desired, they may be sterilized and/or may contain auxiliary substances, such as preserving, stabilizing, wetting or emulsifying agents. They may contain other therapeutically valuable substances. The preparations can be made by the usual methods. This is a continuation-in-part of copending application Ser. No. 775,344, filed November 21, 1958, by Jean Durey and Paul Schmidt, and now abandoned, which is a continuation-in-part of application Ser. No. 718,438, filed March 3, 1958, by Jean Durey and Paul Schmidt, and now abandoned, which itself is a continuation-in-part of application Ser. No. 637,896, filed February 4, 1957, by Jean Druey and Paul Schmidt, and now abandoned.

The following examples illustrate the invention; the quantities, unless given in grams or cc., are given in parts by weight.

*Example 1*

50 grams of 3-amino-4-carbethoxy-pyrazole and 100 grams of urea are mixed together well and heated for 40 minutes in a bath at 200° C. The melt is then extracted with 400 cc. of a hot 1 N-solution of caustic soda, the mixture is filtered to remove a small amount of undissolved material, and the filtrate is rendered acid with glacial acetic acid, and the white precipitate so formed is filtered off with suction. There is obtained 4,6-dihydroxy-pyrazolo(3,4-d) pyrimidine in the form of white crystals, which do not melt even at 300° C.

A solution of 15.2 grams of 4,6-dihydroxy-pyrazolo (3,4-d)pyrimidine in 200 cc. of a 2 N-solution of caustic soda is slowly mixed, while stirring, with 42 grams of dimethyl sulfate. The whole is then stirred for 20 hours at room temperature, and the solution is extracted with a large quantity of chloroform. The residue obtained by evaporating the chloroform solution is recrystallized from boiling water. There is obtained 2,5,7-trimethyl-4,6-dioxo-4,5,6,7-tetrahydropyrazolo(3,4-d)pyrimidine of the formula

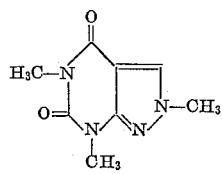

in the form of white crystals melting at 195–196° C.

The 3-amino-4-carbethoxy-pyrazole used as starting material can be prepared as follows:

8.5 grams of ethoxy-methylene-cyanacetic acid ethyl ester are introduced into 50 cc. of alcohol. The solution is then mixed with 2.5 cc. of hydrazine and the whole is boiled for 6 hours under reflux. The whole is evaporated to dryness in vacuo and crystallized from a small amount of water. 3-amino-4-carbethoxy-pyrazole is obtained in the form of while crystals melting at 102–103° C.

The 2,5,7 - trimethyl-4,6-dioxo-4,5,6,7-tetrahydro-pyrazolo(3,4-d)pyrimidine can be used as medicament with caffein-like stimulating activity, e.g. in the form of dragees having the following composition:

| | Milograms |
|---|---|
| 2,5,7-trimethyl-4,6-dioxo-4,5,6,7-tetrahydro-pyrazolo 3,4-d)pyrimidine | 100 |
| Lactose | 86 |
| Acrosit Compositum | 30 |
| Wheat starch | 82 |
| Arrowroot | 35 |
| Magnesium stearate | 2 |
| Talc | 15 |
| | 350 |

The dragees are prepared in the usual manner.

*Example 2*

A mixture of 25 grams of 3-amino-4-carbethoxy-pyrazole and 50 grams of thiourea is heated for one hours in a bath at 200° C. The melt is then taken up on 400 cc. of 2 N-solution of caustic soda and acidified with glacial acetic acid, whereupon 4-hydroxy-6-mercapto-pyrazolo(3,4-d)pyrimidine precipitates as white crystals, which do not melt even at 300° C.

16.8 grams of 4-hydroxy-6-mercapto-pyrazolo(3,4-d)-pyrimidine are dissolved in 200 cc. of a 2 N-solution of caustic soda, and the solution is slowly mixed, while stirring, with 42 grams of dimethyl sulfate. The whole is stirred for 20 hours at room temperature and then extracted with a large quantity of chloroform. The chloroform solution is evaporated and the residue consists of a mixture of two compounds, of which one is sparingly soluble in ethyl acetate and is recrystallized from a large quantity of alcohol. 2,5-dimethyl-6-methylmercapto-4-oxo-4,5-dihydro-pyrazolo(3,4-d)pyrimidine of the formula

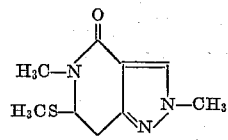

is obtained as white crystals melting at 203–204° C.

*Example 3*

7.5 grams of 3-amino-4-carbethoxy-pyrazole are mixed with 30 cc. of formamide, and the mixture is then heated for 8 hours in a bath at 190–200° C. The whole in then allowed to cool, whereupon a grey crystalline precipitate is formed, and the latter is filtered off with suction. The precipitate is dissolved in dilute caustic soda solution, the solution is agitated with charcoal and adjusted to a pH value of 3–4 with 2 N-hydrochloric acid, whereupon a white precipitate is formed, and the latter is crystallized from a large quantity of boiling water. The 4-hydroxy-pyrazolo(3,4-d)pyrimidine is obtained in the form of white crystals which do not melt even at 350° C.

14 grams of 4-hydroxy-pyrazolo(3,4-d)pyrimidine are introduced into 150 cc. of a 2 N-solution of caustic soda. The solution is slowly mixed, while stirring, with 30 grams of dimethyl sulfate, and the whole is further stirred for 10 hours at room temperature. The solution is then extracted several times with a large quantity of chloroform, and the combined residues, obtained by evaporating the chloroform solution, are crystallized from a large amount of boiling alcohol. There are obtained two compounds, one of which is sparingly soluble in alcohol and melts at 287–289° C., and the other of which dissolves easily in alcohol and melts at 181–182° C. The latter compound is 1,5-dimethyl-4-oxo-4,5-dihydro-pyrazole(3,4-d)pyrimidine of the formula

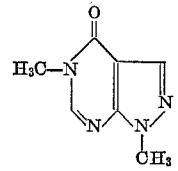

and the first 2,5-dimethyl-4-oxo-4,5-dihydro-pyrazolo-(3,4-d)pyrimidine of the formula

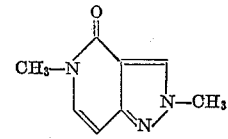

*Example 4*

15.2 grams of the 4,6 - dihydroxy - pyrazolo(3,4 - d) pyrimidine obtainable as indicated in Example 1 are dissolved in 110 cc. of 2 N-caustic soda solution. In the course of 4 hours, 25 grams of dimethylsulfate are added dropwise to the resulting solution and stirring is continued at room temperature for 6 hours. The alkaline solution is then extracted with a large quantity of chloroform, the trimethyl derivative formed as by-product passing into the chloroform phase. The aqueous solution is given a pH of 4, whereupon a white crystalline precipitate is formed which is distilled in caustic soda solution and then precipitated with glacial acetic acid. The resulting precipitate is crystallized several times from boiling water to obtain 4,6 - dioxo-5,7-dimethyl-4,5,6,7-tetrahydro-pyrazolo(3,4-d)pyrimidine of the formula

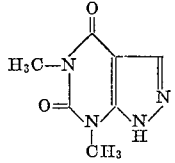

in the form of white crystals of melting point 280° C.

Example 5

15 grams of 4,6-dihydroxy-pyrazolo(3,4-d)pyrimidine and 50 grams of pulverized phosphorus pentasulfide are introduced into 800 cc. of pyridine and the mixture is heated for 6 hours in a bath have a temperature of 130° C. The pyridine is expelled under reduced pressure, the resinous residue mixture with 600 cc. of ice-water, the whole allowed to stand at room temperature for half an hour, and then heated on the water bath for 2 hours. After cooling, the precipitate is filtered off with suction. It is dissolved while hot in dilute caustic soda solution, treated with animal charcoal, precipitated by means of 2 N-acetic acid, filtered with suction, and washed with water and alcohol. In this manner there is obtained 4-mercapto-6-hydroxy-pyrazolo(3,4-d)pyrimidine in the form of crystals which do not melt even at 300° C.

A solution of 12.6 grams of 4-mercapto-6-hydroxy-pyrazolo(3,4-d)pyrimidine in 150 cc. of 2 N-caustic soda solution is mixed in the course of 2 hours with 31.5 grams of dimethyl sulfate. Stirring of the mixture is continued for 6 hours at room temperature and the alkaline solution is then extracted from a large quantity of chloroform. The residue is recrystallized from a small quantity of alcohol to obtain 2,7-dimethyl-4-methyl-mercapto-6-oxo-6,7-dihydropyrazolo(3,4-d)pyrimidine of the formula

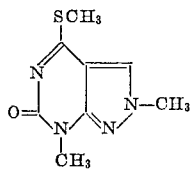

in the form of yellowish crystals of melting point 216–218° C.

Example 6

A solution of 10 grams of the 2,7-dimethyl-4-methyl-mercapto-6-oxo-6,7-dihydro-pyrazolo(3,4-d)pyrimidine in 80 cc. of concentrated hydrochloric acid is boiled for 3 hours. It is then allowed to cool and filtered with suction to separate the white precipitate. The latter is then recrystallized from dilute alcohol. There is obtained 2,7-dimethyl-4,6-dioxo-4,5,6,7 - tetrahydro-pyrazolo(3,4-d)pyrimidine of the formula

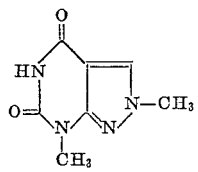

in the form of white crystals melting at 325–327° C.

Example 7

10 grams of the 2,7-dimethyl-4-methylmercapto-6-oxo-6,7-dihydro-pyrazolo(3,4-d)pyrimidine obtainable according to Example 5 and 100 cc. of liquid ammonia are heated at 100° C. for 6 hours in a sealed tube. The grey crystals obtained after evaporation of the ammonia are recrystallized from alcohol and 2,7-dimethyl-4-amino-6-oxo-6,7-dihydro-pyrazolo(3,4-d)pyrimidine of the formula

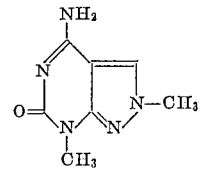

obtained in the form of white crystals which do not melt even at 320° C.

When this substance is treated with alcoholic hydrochloric acid there is obtained its monochloro hydrate which melts at 312° C. with decomposition. In similar manner other salts, such as the sulfate, perchlorate, nitrate or methane sulfonate can be obtained.

Example 8

A solution of 8 grams of the 2,5-dimethyl-6-methyl-mercapto-4-oxo-4,5 - dihydro-pyrazolo(3,4-d)pyrimidine obtained according to Example 2 in 70 cc. of concentrated hydrochloric acid is heated to the boil for 3 hours. After cooling, the resulting white precipitate is separated by filtering with suction. It is crystallized from dilute alcohol and there is obtained 2,5-dimethyl-4,6-dioxo-4,5,6,7-tetrahydro-pyrazolo(3,4-d)pyrimidine of the formula

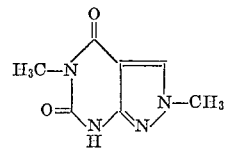

in the form of white crystals which do not melt even at 330° C.

Example 9

In a sealed tube, 8 grams of the 2,5-dimethyl-6-methyl-mercapto-4-oxo-4,5 - dihydro-pyrazolo(3,4-d)pyrimidine obtainable according to Example 2 and 80 cc. of liquid ammonia are heated to 20 hours at 100° C. The ammonia is expelled and the residue crystallized from a large quantity of alcohol. There is obtained the 2,5-dimethyl - 6 - amino-4-oxo-4,5-dihydropyrazolo(3,4-d)pyrimidine of the formula

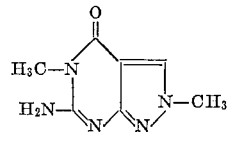

in the form of white crystals which do not melt even at 320° C.

When this substance is treated with alcoholic hydrochloric acid there is obtained its monohydrochloride which melts at 298° C. with decomposition.

Example 10

9 grams of the 4,6-dioxo-5,7-dimethyl-4,5,6,7-tetrahydro-pyrazolo(3,4-d)pyrimidine described in Example 4 are introduced into a solution of 1.3 grams of sodium in 200 cc. of alcohol, and the suspension stirred for 1 hour at room temperature. 6 grams of chlorethyldimethylamine are then admixed and the whole boiled for 10 hours while stirring. The reaction mixture is then evaporated in vacuo. The residue is mixed with 100 cc. of 1 N-caustic soda solution and extracted with chloroform. By recrystallization of the residue from petroleum ether there is obtained the 2-($\beta$-di-methylaminoethyl)-4,6-dioxo-5,7-dimethyl-4,5,6,7-tetrahydro-pyrazolo(3,4-d)pyrimidine in the form of white crystals of melting point 126–127° C.

Example 11

10 grams of 2-isopropyl-3-amino-4-carbamyl-pyrazole and 20 grams of urea are mixed thoroughly and heated for 1 hour in a bath having a temperature of 200° C. The hot melt is then introduced into 150 cc. of 1 N-caustic soda solution, treated with animal charcoal, and filtered with suction. The filtrate is given a pH of 3 with hydrochloric acid, whereupon white crystals precipitate. By recrystallization of the precipitate from water there is obtained 1-isopropyl-4,6-dihydroxy-pyrazolo(3,4-d)pyrimidine of the formula

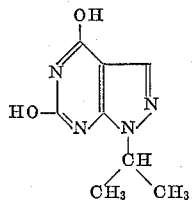

in the form of white crystals of melting point 286–287° C. (with decomposition).

The 2-iso-propyl-3-amino-4-carbamylpyrazole used as starting material can be prepared as follows:

A solution of 48.8 parts of ethoxymethylene-malonitrile in 500 parts by volume of alcohol is mixed with 30 grams of isopropyl hydrazine. The mixture is then heated to the boil for 10 hours, evaporated to dryness under reduced pressure, and the residue crystallized from a large quantity of isopropyl ether. 2-isopropyl-3-amino-4-cyano-pyrazole is obtained in this manner in the form of white crystals of melting point 94–95° C. 10 grams of the compound thus obtained are mixed with 200 cc. of 2 N-caustic soda solution and 100 cc. of alcohol, and the solution boiled for 3 hours. The alcohol is evaporated under reduced pressure, the reaction mass allowed to cool, and the precipitate separated by filtering with suction. The precipitate is recrystallized from alcohol. There is obtained 2-isopropyl-3-amino-4-carbamyl-pyrazole in the form of white crystals of melting point 215–216° C.

*Example 12*

A solution of 10 grams of the 1-isopropyl-4,6-dihydroxy-pyrazolo(3,4-d)pyrimidine described in Example 11 in 75 cc. of 2 N-caustic soda solution is mixed slowly, while being stirred, with 14 grams of dimethyl sulfate. The reaction mass is allowed to stand overnight and extracted with chloroform in the morning. The chloroform residue is recrystallized from alcohol to obtain 1-isopropyl - 4,6 - dioxo - 5,7 - dimethyl - 4,5,6,7 - tetrahydro-pyrazolo(3,4-d)pyrimidine of the formula

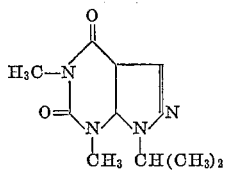

in the form of white crystals melting at 141–142° C.

*Example 13*

19.7 grams of 2-isopropyl-4-carbethoxy-3-amino-pyrazole are heated with 50 cc. of formamide for 4 hours in a bath of 200–210° C. After cooling, the reaction mixture is taken up in 2 N-caustic soda solution, treated with animal charcoal, and precipitated by adjusting the pH to 3 with 2 N-hydrochloric acid. 1-isopropyl-4-hydroxy-pyrazolo(3,4-d)pyrimidine of a formula

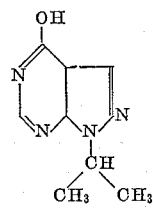

is obtained in the form of crystals of melting point 197–198° C.

The 2-isopropyl-4-carbethoxy-3-amino-pyrazole used as starting material can be prepared as follows:

8.2 grams of isopropyl hydrazine are introduced into a solution of 16.9 grams of ethoxymethylenecyano-acetic acid ethyl ester in 100 cc. of alcohol and boiled for 12 hours. The reaction mass is then evaporated to dryness and the residue distilled in vacuo. 2-isopropyl-3-amino-4-carebethoxy-pyrazole passes over at 164–166° C. under a pressure of 10 mm. and solidifies in crystalline form in the receiver. The colorless crystals obtained melt at 46–48° C.

*Example 14*

9 grams of 5,7-dimethyl-4,5,6,7-tetrahydro-4,6-dioxo-pyrazolo(3,4-d)pyrimidine are introduced into a solution of 1.2 grams of sodium in 200 cc. of anhydrous ethyl alcohol. The reaction mixture is stirred for 1 hour at room temperature. 7 grams of chlorethyldiethylamine are then added and the whole heated to the boil for 10 hours while stirring. After cooling, the precipitated salt is removed by filtering with suction and the filtrate evaporated to dryness. The residue, is mixed with 20 cc. of 3 N-caustic soda solution and extracted with a large quantity of chloroform. By distilling off the chloroform and recrystallizing the residue from isopropyl ether there is obtained the 2-(β-diethylaminoethyl)-5,7-dimethyl-4,6-dioxo-4,5,6,7 - tetrahydro-pyrazolo(3,4 - d)pyrimidine of melting point 85–87° C.

*Example 15*

9 grams of 1-isopropyl-4-hydroxy-pyrazolo(3,4-d)pyrimidine are dissolved in 40 cc. of 2 N-caustic soda solution and mixed slowly, while being agitated, with 8 grams of dimethyl sulfate. A white product precipitates and is separated by filtration with suction. By recrystallization from water there is obtained 1-isopropyl-5-methyl-4-oxo - 4,5 - dihydroxypyrazolo(3,4 - d)pyrimidine in the form of white crystals melting at 162–163° C.

*Example 16*

10 grams of 2-methyl-3-amino-4-carbamyl-pyrazole and 20 grams of urea are thoroughly mixed and heated for 3 hours in a bath of 200° C. The hot melt is then poured into 150 cc. of 1 N-caustic soda solution, treated with animal charcoal, and filtered with suction. The filtrate is given a pH of 3 with hydrochloric acid whereupon white crystals separate. By recrystallization of the precipitate from a large amount of water, the 1-methyl-4,6-dihydroxy-pyrazolo(3,4-d)pyrimidine is obtained in the form of white crystals which do not melt when heated to 300° C.

7.5 grams of dimethyl sulfate are added dropwise to a solution of 4.2 grams of 1-methyl-4,6-dihydroxy-pyrazolo(3,4-d)pyrimidine in 30 cc. of 3 N-caustic soda solution, and stirring continued for 10 hours. The pH is then adjusted to 9 with 2 N-caustic soda solution, which operation is followed by extraction with chloroform. The chloroform residue is recrystallized from much alcohol. 1,5,7 - trimethyl-4,6-dioxo-4,5,6,7-tetrahydropyrazolo(3,4-d)-pyrimidine is thus obtained in the form of white crystals of melting point 230–231° C.

The 2-methyl-3-amino-4-carbamyl-pyrazole used as starting material can be obtained as follows:

A solution of 40 grams of ethoxymethylene-malonitrile in 400 cc. of ethanol is mixed with 27 grams of methyl hydrazine. The mixture is boiled for 10 hours, allowed to cool, and the precipitated product separated by filtration. 2-methyl-3-amino-4-cyano-pyrazole is thus obtained in the form of white crystals of melting point 219–220° C. 10 grams of this compound are mixed with 200 cc. of 2 N-caustic soda solution and 100 cc. of ethanol, and the solution boiled for 3 hours. The ethanol is evaporated under reduced pressure, the reaction mass allowed to cool, and the precipitate separated by filtration with suction. The product is recrystallized from ethanol. There is thus obtained 2-methyl-3-amino-4-carbamyl-pyrazole in the form of white crystals of melting point 232–234° C.

*Example 17*

A mixture of 17.5 parts of 3-amino-4-pyrazole-carboxamide (obtainable by condensation of ethoxymethylene-malonitrile with hydrazine and hydrolysis of the 3-amino-4-cyano-pyrazole with concentrated sulfuric acid) and 35 parts of urea is heated at 160–180° C. for 90 minutes and then cooled. The solid fusion product is washed with water. 13 parts of the unpurified 4,6-dihydroxy-pyrazolo(3,4-d)pyrimidine thus obtained are dissolved in 50 parts of 10% aqueous sodium hydroxide solution and 100 parts of water by heating. The solution is then brought to about 40° C. and treated with 90 parts of 95% ethanol and 28.6 parts of bromoethane and the mixture is refluxed for one day. Then, at 2 hour intervals, 5 portions each of 17 parts of bromoethane and 22 parts of 10% sodium hydroxide are added. The reaction mixture is taken almost to dryness and the resulting residue is exhaustively extracted with chloroform. The chloroform extract is dried over anhydrous sodium sulfate, stirred with activated carbon, filtered and taken to dryness under vacuum. The residue is taken up in a solution containing 7 parts of benzene to 3 parts of petroleum ether and applied to a chromatography column containing 500 parts of alumina. Elution of the column with benzene yields first in impurity and later the 2,5,7-triethyl-4,6-dioxo-4,5,6,7-tetrahydro-pyrazolo(3,4-d)pyrimidine. Recrystallized from dilute ethanol the compound melts at about 118–120° C. The chromatography column described above is further developed with benzene solutions containing increasing concentrations of ethyl acetate. Elution with a 50% solution of ethyl acetate in benzene yields 5,7-diethyl-4,6-dioxo - 4,5,6,7-tetrahydropyrazolo(3,4-d)pyrimidine which, crystallized from water, melts at about 205–207° C. The amount of this fraction can be increased by decreasing the amount of bromoethane in the alkylation procedure.

*Example 18*

A solution of 2.3 grams of sodium in 40 cc. of absolute ethanol is added to a solution of 15.05 grams of cyclohexylhydrazine hydrochloride in 50 cc. of absolute ethanol. 16.9 grams of ethoxy-methylene-cyanoacetic acid ethyl ester, dissolved in 20 cc. of ethanol are added to the reaction solution, and the whole is heated for 10 hours at the boil. After cooling the mixture, the precipitated sodium chloride is filtered off with suction, and the filtrate is evaporated to dryness. The crystalline residue is triturated with water and filtered with suction. There is obtained 2-cyclohexyl-3-amino-4-carbethoxy-pyrazole melting at 112–114° C. After being recrystallized from petroleum ether the melting point of the product rises to 115–116° C.

20 grams of 2-cyclohexyl-3-amino-4-carbethoxypyrazole are heated with 50 grams of formamide for 6 hours in a bath having a temperature of 200–210° C. After cooling the mixture, 1-cyclohexyl-4-hydroxy-pyrazolo(3,4-d)-pyrimidine crystallizes out. It melts at 245–246° C.

*Example 19*

16.9 grams of ethoxy-methylene-cyanoacetic acid ethyl ester and 8.8 grams of secondary-butyl-hydrazine are heated in 100 cc. of absolute ethanol for 10 hours at the boil. The mixture is then evaporated in vacuo, and the residue is distilled in vacuo. 2-(secondary-butyl)-3-amino-4-carbethoxy-pyrazole boils under 0.09 mm. pressure at 105–107° C.

10.5 grams of 2-(secondary-butyl)-3-amino-4-carbethoxy-pyrazole are heated with 25 cc. of formamide for 6 hours at 200–210° C. The reaction solution is cooled to 0° C. and there is obtained crystalline 1-(secondary-butyl)-4-hydroxy-pyrazolo(3,4-d)pyrimidine of the formula

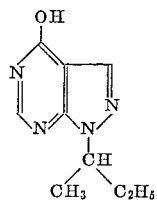

melting at 174–175° C.

*Example 20*

86 grams of methyl-isopropyl ketone are added to a solution of 50 grams of hydrazine hydrate in 500 cc. of 2 N-hydrochloric acid with stirring and ice-cooling. Hydrogenation is then carried out at room temperature and 19 atmosphere gauge pressure with 2 grams of platinum oxide as catalyst. Within an hour 22.4 liters of hydrogen are taken up, which corresponds to one mol of $H_2$. The catalyst is filtered off with suction, the reaction mixture is evaporated to dryness under reduced pressure and 500 cc. of concentrated sodium hydroxide solution are added to the residue, 3-hydrazino-2-methyl-butane separating in the form of oil. For the purpose of purification the oil separated in the separating funnel is distilled. 3-hydrazino-2-methyl-butane passes over at 39–44° C. under 11 mm. of pressure.

21 grams of 3-hydrazino-2-methyl-butane are added to a solution of 24.4 grams of ethoxy-methylene-malonic acid-dinitrile in 250 cc. of ethanol. The reaction mixture is heated under reflux for 12 hours, allowed to cool and the precipitate filtered with suction. After recrystallization from ethanol there is obtained 2-[3'-methyl-butyl-(2)]-3-amino-4-cyano-pyrazole in the form of white crystals melting at 167–168° C.

200 cc. of 2 N-sodium hydroxide solution and 100 cc. of alcohol are added to 18 grams of 2-[3'-methyl-butyl-(2')]-3-amino-4-cyano-pyrazole and the solution heated at the boil for 3 hours. The alcohol is evaporated under reduced pressure, the reaction mixture allowed to cool and the precipitate suction-filtered. The latter is recrystallized from alcohol and there is obtained 2-[3'-methyl-butyl-(2')]-3-amino-4-carbamyl-pyrazole in the form of white crystals melting at 227–228° C.

10 grams of 2-[3'-methyl-butyl-(2')]-3-amino-4-carbamyl-pyrazole are heated with 30 grams of formamide for 5 hours in a bath at 200–210° C. After cooling, 1-[3' - methyl-butyl-(2')]4-hydroxy-pyrazolo(3,4-d)pyrimidine of the formula

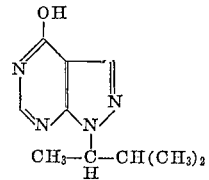

crystallizes; the product melts at 190–192° C.

*Example 21*

344 grams of diethyl ketone are added to a solution of 200 grams of hydrazine hydrate in 528 cc. of 7.57 N-hydrochloric acid with stirring and ice-cooling. After adding 270 cc. of ethanol the whole is stirred for 30 minutes. Hydrogenation is carried out at room temperature and under 130 atmospheres gauge pressure with 2 grams of platinum oxide as catalyst. Within 15 minutes the quantity of hydrogen calculated for 4 mols, 89.6 liters, is taken up. The catalyst is suction-filtered, the filtrate is adjusted to pH 4 with 2 N-hydrochloric acid and the solution is concentrated under reduced pressure until crystallization sets in. 500 cc. of concentrated sodium hydroxide solution are added with ice-cooling. Solid sodium hydroxide is added until isopentylhydrazine separates as an oil. The oil is decanted off, dried over sodium hydroxide and distilled. Pentyl-3-hydrazine passes over between 102 and 109° C.

84.5 grams of ethoxymethylene cyanacetic acid ethyl ester and 51 grams of pentyl-3-hydrazine are heated to the boil in 500 cc. of absolute alcohol for 10 hours. The whole is evaporated under reduced pressure and the residue distilled in vacuo. 2-pentyl-(3')-3-amino-4-carbethoxy-pyrazole boils at 175° C. under 11 mm. of pressure.

22.5 grams of 2-pentyl-(3')-3-amino-4-carbethoxy-pyrazole are heated in 50 cc. of formamide at 200–210° C. for 10 hours. After cooling, the reaction product is extracted with methylene chloride. The methylene chloride solution is washed twice with water and then evaporated. The resulting residue is dissolved in 2 N-sodium hydroxide solution. By acidifying with 2 N-hydrochloric acid there is obtained 1-pentyl-(3')-4-hydroxy-pyrazolo(3,4-d)pyrimidine of the formula

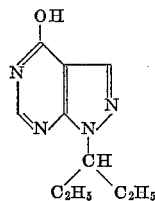

melting at 140–141° C. On recrystallization from a mixture of ether and petroleum ether the melting point is raised to 142–143° C.

*Example 22*

336 grams of cyclopentanone are added to a solution of 200 grams of hydrazine hydrate in 572 cc. of 7 N-hydrochloric acid with stirring and ice-cooling. Hydrogenation is carried out at room temperature under 100 atmospheres gauge pressure with 2 grams of platinum oxide as catalyst. Within an hour the quantity of hydrogen calculated for 4 mols. 89.6 liters, is taken up. The catalyst is filtered off with suction, the filtrate is adjusted to pH 4 with 2 N-hydrochloric acid and the solution evaporated in vacuo until crystallization sets in. 500 cc. of concentrated sodium hydroxide solution are then added with ice-cooling. Solid sodium hydroxide are then added until cyclopentyl hydrazine separates as an oil. The latter distils at 60–65° C. under 11 mm. of pressure.

67.6 grams of ethoxymethylene cyanacetic acid ethyl ester and 40 grams of cyclopentyl hydrazine are boiled under reflux in 400 cc. of absolute alcohol for 10 hours. The solution is evaporated in vacuo and the residue distilled in high vacuum. 2-cyclopentyl-3-amino-4-carbethoxy-pyrazole boils at 152° C. under 0.15 mm. of pressure. The melting point of the compound is 64–66° C.

22.3 grams of 2-cyclopentyl-3-amino-4-carbethoxy-pyrazole are heated in 50 cc. of formamide at 200–210° C. for 10 hours. After cooling, the precipitated crystals are suction-filtered, dissolved in 1 N-sodium hydroxide solution, filtered and the filtrate acidified with 2 N-hydrochloric acid to pH 4, whereby 1-cyclopentyl-4-hydroxy-pyrazolo (3,4-d)pyrimidine melting at 225-226° C. separates.

*Example 23*

392 grams of cyclohexanone are added to a solution of 200 grams of hydrazine hydrate in 572 cc. of 7 N-hydrochloric acid with stirring and ice-cooling. Hydrogenation is then carried out at room temperature and under 100 atmospheres gauge pressure with 2 grams of platinum oxide as catalyst. Within 30 minutes the quantity of hydrogen calculated for 4 mols, 89.6 liters, is taken up. 1000 cc. of ethyl alcohol are added in order to dissolve the precipitated crystals. The catalyst is then filtered off with suction, the filtrate is adjusted to pH 4 and evaporated in vacuo until crystallization sets in. After cooling, the precipitated crystals are filtered and the filtrate mixed with 500 cc. of concentrated sodium hydroxide solution with ice-cooling. Solid sodium hydroxide is then added until cyclohexylhydrazines separates as an oil. The latter distils at 77–80° under 12 mm. of pressure. The resulting distillate is reacted immediately with alcoholic hydro-chloric acid into the hydrochloride; melting point 112–113° C.

150.5 grams of cyclohexyl-hydrazine hydrochloride are dissolved in 500 cc. of ethyl alcohol and a solution of 23 grams of sodium in 400 cc. of ethyl alcohol is added with stirring to a solution of 122 grams of ethoxymethylene malonic acid dinitrile, the temperature rising to about 45° C. The mixture is then heated at the boil for 10 hours, allowed to cool and the precipitated sodium chloride filtered off. The filtrate is evaporated to dryness in vacuo. The residue is dissolved in 200 cc. of ethyl alcohol, filtered and the solution poured into 1400 cc. of water with stirring, 2-cyclohexyl-3-amino-4-cyanopyrazole which melts at 124–126° C., precipitating in the form of crystals.

57 grams of 2-cyclohexyl-3-amino-4-cyano-pyrazole are boiled under reflux for 2½ hours in 230 cc. of absolute alcohol and 230 cc. of 2 N-sodium hydroxide solution. After cooling, the crystals are suction-filtered. There is obtained 2-cyclo-hexyl-3-amino-pyrazole-4-carboxylic acid amide melting at 267–268° C.

30 grams of 2-cyclohexyl-3-amino-pyrazole-4-carboxylic acid amide are heated at 200° C. for 1½ hours with 60 grams of urea. After cooling, 1 N-sodium hydroxide is added to the reaction product, a small quantity of undissolved matter is filtered off, and the filtrate acidified with 5 N-hydrochloric acid, whereupon a precipitate separates. The latter is taken up in dimethyl-formamide, filtered and allowed to crystalline out. There is obtained 1 - cyclohexyl-4:6-dihydroxy-pyrazolo(3,4-d)pyrimidine melting at 330° C. with decomposition.

*Example 24*

75 grams of 2-secondary butyl-3-amino-4-cyano-pyrazole are boiled under reflux for 2½ hours in 750 cc. of absolute alcohol and 1500 of 2 N-sodium hydroxide solution. The solution is then concentrated to a volume of about 1000 cc. in vacuo at a temperature of 50° C. and then cooled to 0° C. The separated crystals are filtered off. There is obtained 2-secondary butyl-3-amino-pyrazole-4-carboxylic acid amide melting at 198–199° C.

60 grams of 2-secondary butyl-3-amino-pyrazole-4- carboxylic acid amide are heated at 200° C. for 1½ hours with 120 grams of urea. After cooling, 2.5 N-sodium hydroxide solution is added to the reaction product, any undissolved material is filtered off and the filtrate acidified to a pH value of 3 with hydrochloric acid of 27% strength, whereupon crystals separate. The latter are dissolved in alcohol, the solution is filtered, the filtrate evaporated and water added, whereupon crystallization sets in. There is obtained 1-secondary butyl-4:6-dihydroxy-pyrazolo(3,4-d)pyrimidine melting at 225-227° C.

*Example 25*

A solution of 11.6 grams of $N_1$-isopropyl-$N_2$-acetyl-hydrazine and 17 grams of ethoxymethylene-cyanacetic acid ester, in 250 cc. of ethanol is boiled for 12 hours under reflux. The ethanol is then evaporated in vacuo, 150 cc. of 8 N-alcoholic hydrochloric acid are added to the oily residue containing $\beta$-($N_2$-acetyl-$N_1$-isopropyl-hydrazino)-$\alpha$-cyanoacrylic acid ethyl ester, and the whole is boiled under reflux for 2 hours. The mixture is again evaporated in vacuo, the residue is taken up in 2 N-aqueous hydro-chloric acid, the solution is filtered to remove undissolved material, and its pH value is adjusted to 8 to 9 with caustic soda solution. The mixture is then extracted with chloroform and the residue obtained by evaporating chloroform is recrystallized from cyclohexane.

There is obtained 1-isopropyl-3-amino-4-carbethoxy-pyrazole of the formula

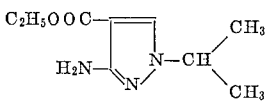

in the form of white crystals melting at 72–73° C.

19.7 grams of 1-isopropyl-3-amino-4-carbethoxy-pyrazole and 30 grams of urea are thoroughly mixed together and heated for 2 hours in a bath at 200° C. The hot melt is then introduced into 150 cc. of 1 N-solution of caustic soda, and the mixture is treated with animal charcoal and filtered with suction. The filtrate is given a pH value of 1–2 with hydrochloric acid, whereupon a white product precipitates. The latter is crystallized from a large quantity of water, and there is obtained 2-isopropyl-4:6-dihydroxy-pyrazolo(3,4-d)pyrimidine melting at 280–282° C.

2.8 grams of dimethyl sulfate are slowly added while stirring, to a solution of 1.9 grams of 2-isopropyl-4:6-dihydroxypyrazolo(3,4-d)pyrimidine in 15 cc. of a 2 N-solution of caustic soda. The whole is allowed to stand overnight and the precipitate that is formed is filtered off with suction. The latter is recrystallized from a large quantity of petroleum ether, and in this manner there is obtained 2-isopropyl-4,6-dioxo-5,7-dimethyl-4,5,6,7-tetrahydro-pyrazolo(3,4-d)pyrimidine of the formula

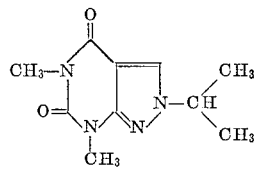

in the form of white crystals melting at 182–184° C.

*Example 26*

3 grams of 1-ethyl-3-amino-4-carbethoxy-pyrazole, dissolved in 25 cc. of benzene are heated with 5.17 cc. of ethyl isocyanate and 0.5 cc. of triethylamine in a closed tube for 10 hours at 100° C. By evaporating the reaction solution, there is obtained crude crystalline N-[1-ethyl-4-carbethoxypyrazolyl - (3)] - N' - ethyl - N' - ethyl - carbamyl-urea of the formula

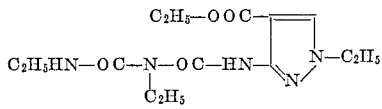

The crude product, which melts at 83–84° C. after recrystallization from a mixture of ether and petroleum ether may be used as such for carrying out the following ring closure:

1 gram of the crude N-[1-ethyl-4-carbethoxy-pyrazolyl-(3)]-N'-ethyl-N'-ethylcarbamyl-urea is boiled under reflux in 10 cc. of a 2 N-solution of caustic soda for 7 minutes under reflux. After being cooled the aqueous solution is extracted with ether and adjusted to a pH value of 5 with 2 N-acetic acid, whereby 2:5-diethyl-4:6-dioxo-4,5,6,7-tetrahydro-pyrazolo-(3,4-d)pyrimidine of the formula

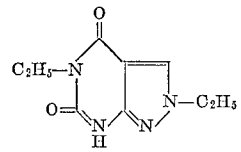

precipitates out, melting at 257–258° C.

*Example 27*

10.9 grams of 1-isopropyl-3-amino-4-carbethoxy-pyrazole are heated in 85 cc. of benzene with 12.6 grams of methyl isocyanate and 1.66 cc. of triethylamine at 100° C. for 10 hours in a closed tube. The reaction solution is evaporated to yield an oily residue, which consists substantially of N-[1-isopropyl-4-carbethoxy-pyrazolyl(3)]-N'-methyl-N'-methylcarbamyl urea of the formula

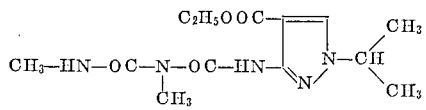

6.1 grams of this crude product are mixed with 60 cc. of a 2 N-solution of caustic soda and the whole is boiled under reflux for 12 minutes. The aqueous reaction solution is extracted with ether, and the aqueous solution is acidified with 2 N-acetic acid to a pH value of 4.5, whereupon 2-isopropyl-4,6-dioxo-5-methyl - 4,5,6,7 - tetrahydropyrazolo(3,4-d)pyrimidine of the formula

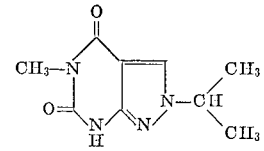

melting at 232–233° C. precipitates.

The 1-alkyl-pyrazoles used in the above example and in Example 26 can be obtained as follows:

8 grams of $N_1$-isopropyl-$N_2$-benzylidene-hydrazine and 8 grams of ethoxy-methylene-cyanacetic acid ethyl ester are heated in 50 cc. of benzene for 10 hours at 80° C. After the solvent has been removed in vacuo, the residue is recrystallized from ethanol. There is obtained $\beta$-($N_2$-benzylidene-$N_1$-isopropyl-hydrazino)-$\alpha$-cyano-acrylic acid ethyl ester in the form of yellow prisms melting at 118–120° C.

4 grams of $\beta$-($N_2$-benzylidene-$N_1$-isopropyl-hydrazino)-$\alpha$-cyano-acrylic acid ethyl ester are boiled for 2 hours with 10 N-alcoholic hydrochloric acid; the alcohol is then removed by distillation in vacuo. The residue is taken up in 200 cc. of 2 N-hydrochloric acid and the solution extracted with ether. After separating the aqueous solution, the latter is rendered alkaline by adding 2 N-sodium hydroxide solution. The separated base is extracted with ether. After drying and evaporating the ether, 1-isopropyl-3-amino-4-carbethoxy-pyrazole of the formula

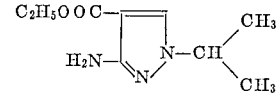

remains which recrystallizes from cyclohexane in the form of white lamellae melting at 72–73° C.

In a similar manner 1-ethyl-3-amino-4-carbethoxy-pyrazole boiling at 111° C. under 0.06 mm. of pressure can be obtained.

*Example 28*

19.7 grams of 1-isopropyl-3-amino-4-carbethoxy-pyrazole are heated in 50 cc. of formamide for 5 hours in a bath having a temperature of 200–210° C. After cooling, the crystalline precipitate is suction-filtered and crystallized from boiling ethyl alcohol for the purpose of purification. 2 - isopropyl-4-hydroxy-pyrazolo(3,4 - d)pyrimidine is obtained in the form of crystals melting at 229–230° C.

*Example 29*

4.5 grams of 2-isopropyl - 4 - hydroxy-pyrazolo(4,4-d) pyrimidine are added to 20 cc. of 2 N-sodium hydroxide solution. 4 grams of dimethyl sulfate are slowly added to the solution with stirring and the whole is stirred for 2 hours at room temperature. The precipitate is suction-filtered and crystallized from benzene. 2-isopropyl-4-oxo-5-methyl-4,5-dihydro - pyrazolo(3,4 - d)pyrimidine is obtained in the form of white crystals melting at 209–210° C.

*Example 30*

3 grams of 1-ethyl-3-amino-4-carbethoxy-pyrazole are dissolved in 7 cc. of formamide and heated for 10 hours at 200–220° C. in an oil bath. The crystals which separate on cooling are suction-filtered, washed with ether and recrystallized from alcohol. 2-ethyl - 4 - hydroxy-pyrazolo (3,4-d)pyrimidine is obtained melting at 235–237° C.

*Example 31*

A mixture of 5 grams of 1-methyl-3-amino-4-carbethoxy-pyrazole and 4 grams of urea is heated for 10 hours at 170° C. The reaction product is dissolved in 20 cc. of warm 2 N-sodium hydroxide solution. On adding dilute hydrochloric acid to the alkaline solution, 2-methyl-4,6-dihydroxy - pyrazolo(3,4 - d)pyrimidine precipitates. It melts at >360° C.

*Example 32*

5 grams of dimethyl sulfate are added in portions to a solution of 5 grams of 2-methyl-4,6-dihydroxy-pyrazolo (3,4-d)pyrimidine in 20 cc. of 2 N-sodium hydroxide solution at room temperature. After 30 minutes the aqueous solution is extracted with chloroform. The residue remaining after drying and evaporating the chloroform extract is recrystallized from benzene. 2,5,7-trimethyl-4,6-dioxo-4,5,6,7-tetrahydropyrazolo(3,4 - d)pyrimidine melting at 195–196° C. is obtained.

*Example 33*

5 grams of 1-methyl-3-amino-4-carbethoxy-pyrazole and 4 grams of thiourea are heated for 10 hours at 170° C. The reaction product is dissolved in 20 cc. of 2 N-sodium hydroxide solution. After filtering through active charcoal and adding dilute hydrochloric acid, 2-methyl-4-hydroxy-6-mercapto - pyrazolo(3,4 - d)pyrimidine is precipitated melting at >360° C.

*Example 34*

In a sealed tube, 20 g. of 1-methyl-3-amino-4-carbethoxy-pyrazole in 85 cc. of benzene are heated at 100° C. for 10 hours with 10 g. of methylisocyanate. When the reaction solution has cooled, the crystals which have separated are filtered off with suction. There is obtained in this manner the N-(1-methyl-4-carbethoxy-3-pyrazolyl)-N'-methyl urea of the formula

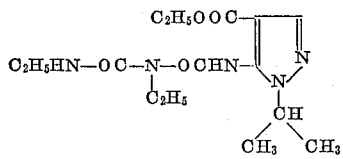

of melting point 119° C.

21 g. of the afore-described substituted urea are heated at 90° C. for 30 minutes in 20 cc. of 5 N-caustic soda solution. When the reaction solution has cooled, the pH is adjusted to 1 with 2 N-hydrochloric acid, after which the 2,5-dimethyl-4,6-dioxo-4,5,6,7 - tetrahydro - pyrazolo(3,4-d)pyrimidine separates in the form of white crystals of melting point 342–344° C.

The 1-methyl-3-amino-4 - carbethoxy - pyrazole used as starting material is obtained as follows:

A solution of 65 grams of N₁-methyl-N₂-benzylidene-hydrazine and 85 grams of ethoxy-methylene-cyano-acetic acid ethyl ester in 500 cc. of benzene is boiled under reflux for 10 hours. A precipitate is formed which is filtered and recrystallized from ethanol. β-(N₂-benzylidene-N₁-methyl-hydrazino)-α-cyano-acrylic acid ethyl ester in the form of faintly yellow crystals melting at 155–156° C. is obtained.

80 grams of β-(N₂-benzylidene-N₁-methyl-hydrazino)-α-cyano-acrylic acid ethyl ester are boiled under reflux for 2 hours with 10 N-alcoholic hydrochloric acid. The solvent is removed by distillation in vacuo. The residue is taken up in 200 cc. of 2 N-hydrochloric acid and the acid solution extracted with ether. After separating the aqueous layer it is rendered alkaline by adding 2 N-sodium hydroxide solution. The precipitated base is extracted several times with ether. After separating, drying and evaporating the ether extract, the residue is distilled at 130° C. under 0.01 mm. of pressure, 1-methyl-3-amino-4-carbethoxy-pyrazole of the formula

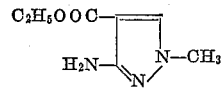

melting at 92–93° C. is obtained.

*Example 35*

19.7 grams of 2-isopropyl-3-amino-4-carbethoxy-pyrazole, dissolved in 150 cc. of benzene, are heated with 28.4 grams of ethyl isocyanate and 3 cc. of triethylamine for 10 hours at 100° C. in a closed tube. Upon evaporating the reaction solution there is obtained crude crystalline N-[2-isopropyl - 4 - carbethoxy-pyrazolyl-(3)]-N'-ethyl-N-ethylcarbamyl-urea of the formula

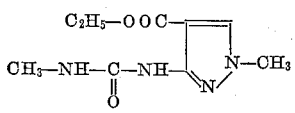

The crude product, which melts at 129–130° C. after recrystallization from ether, may be used directly for ring closure in the following manner: 16 grams of crude N-[2-isopropyl-4-carbethoxy-pyrazolyl-(3)]-N' - ethyl-N'-ethylcarbamyl-urea are mixed with 160 cc. of a 2 N-solution of caustic soda, and the whole is boiled under reflux for 8 minutes in an oil bath having a temperature of 150° C. After being cooled, the reaction solution is given a pH value of 4.5 by the addition of 2 N-acetic acid, whereupon 1-isopropyl - 4,6 - dioxo-5-ethyl-4,5,6,7-tetrahydropyrazolo(3,4-d)pyrimidine precipitates. It melts at 202–204° C.

When the 2-isopropyl-3-amino-4-carbethoxy-pyrazole is reacted in the above manner with only one molecular proportion of ethyl cyanate, there is obtained an intermediate product from which, after distilling off the starting material at 127° C. under 0.99 mm. pressure, N-[2-isopropyl-4-carbethoxy-pyrazolyl-(3)]-N'-ethyl-urea melting at 129–130° C. (after crystallization from a mixture of ether and petroleum ether), can be isolated. It can be subjected to ring closure in the manner described above.

*Example 36*

13.8 grams of 2-isopropyl-3-amino-4-carbethoxy-pyrazole are heated in 105 cc. of benzene with 16 grams of methyl isocyanate and 2.1 cc. of triethylamine in a closed tube for 10 hours at 100° C. By evaporating the reaction solution, there is obtained crude crystalline N-[2-isopropyl-4-carbethoxy-pyrazolyl-(3)]-N'-methyl-N'-methylcarbamyl-urea of the formula

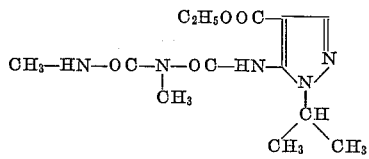

The crude product, which melts at 145–146° C. after recrystallization from alcohol, can be used directly for ring closure as follows:

5 grams of crude N-[2-isopropyl-4-carbethoxy-pyrazolyl-(3)]-N'-methyl-N'-methylcarbamyl-urea are boiled under reflux for 7 minutes in 50 cc. of a 2 N-solution of caustic soda. The reaction solution is extracted with ether and adjusted to a pH value of 4.5 with 2 N-acetic acid, whereupon 1-isopropyl-4,6-dioxo-5-methyl-4,5,6,7-tetrahydro-pyrazolo(3,4-d) - pyrimidine precipitates. It melts at 235–236° C.

*Example 37*

3.64 grams of 2-methyl-3-amino-4-carbethoxy-pyrazole, dissolved in 32 cc. of benzene, are heated with 4.92 grams of methyl isocyanate and 0.7 cc. of triethylamine in a closed tube for 10 hours at 100° C. By evaporating the reaction solution there is obtained crude crystalline N-[2-methyl - 4 - carbethoxy-pyrazolyl - (3)] - N'-methyl-N'-methylcarbamyl-urea of the formula

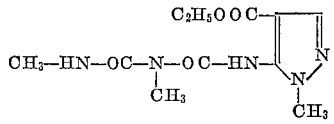

The crude product, which melts at 148–149° C. after recrystallization from alcohol, can be used directly for the subsequent ring closure as follows:

1 gram of crude N-[2-methyl-4-carbethoxy-pyrazolyl-(3)]-N'-methyl-N'-methylcarbamyl-urea are boiled under reflux in 10 cc. of a 2 N-solution of caustic soda for 7 minutes. The aqueous reaction solution is extracted with ether and then adjusted to a pH value of 5 with 2 N-acetic acid, whereupon 1,5-dimethyl-4,6-dioxo-4,5,6,7-tetrahydropyrazolo(3,4 - d)pyrimidine precipitates. It melts at 297–298° C.

Example 38

5 grams of 1-methyl-3-amino-4-carbethoxy-pyrazole are heated with 15 cc. of formamide for 10 hours at 190° C. After cooling to room temperature the precipitate is filtered and recrystallized from water. 2-methyl-4-hydroxy-pyrazolo(3,4-d)pyrimidine is obtained in the form of white crystals melting at 193° C.

Example 39

A solution of 5 grams of ethyl-isocyanate and 10 grams of 1-methyl-3-amino-4-carbethoxy-pyrazole in 50 cc. of benzene is heated at 100° C. in an autoclave for 6 hours. After evaporating the solvent in vacuo, a solid residue remains which is recrystallized from ether-cyclohexane. N-ethyl - N' - (1 - methyl-4-carbethoxy-3-pyrazolyl)-urea of the formula

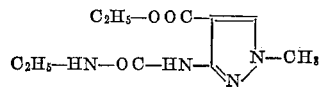

is obtained in the form of prisms melting at 112° C.

15 grams of this urea are heated at 90° C. in 100 cc. of 5 N-sodium hydroxide solution for 1 hour. The solution is filtered, and by adding 2 N-hydrochloric acid 2-methyl - 5 - ethyl-4,6-dioxo - 4,5,6,7 - tetrahydro-pyrazolo-(3,4-d)pyrimidine of the formula

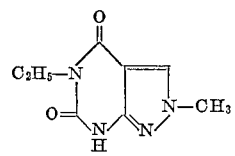

precipitates. After recrystallization from water the compound melts at 303° C.

Example 40

60 cc. of phosphorus oxychloride are added to 3 grams of 1,5 - dimethyl - 4,6-dioxo-4,5,6,7-tetrahydropyrazolo [3,4-d]pyramidine and boiled under reflux. After about 3 hours the substance is in solution, and boiling under reflux is continued for another 5 hours. The reaction solution is evaporated at a water jet pump at a temperature of about 60° C. The residue is poured on to ice, the pH is adjusted to 10 with 2 N-sodium hydroxide solution, and extraction is carried out with chloroform. The chloroform solution is evaporated and the residue is recrystallized from ether. There is obtained 1,5-dimethyl- 4-oxo-6-chloro-4,5 - dihydro-pyrazolo[3,4-d]pyrimidine of the formula

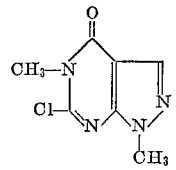

melting at 177–178° C.

Example 41

60 cc. of phosphorus oxychloride are added to 4 grams of 1-isopropyl-4,6-dioxo-5 - methyl-4,5,6,7 - tetrahydropyrazolo(3,4-d)pyrimidine and heated for 8 hours at the boil. After about 1 hour the substance is in solution. For the purpose of working up, the reaction solution is concentrated in vacuo at a maximum temperature of 50° C. The residue is poured on to ice, the pH is adjusted to 10 with 2 N-sodium hydroxide solution, and extraction is carried out with ample ether. From the evaporated ether solution there is obtained 1-isopropyl-4-oxo-5-methyl-6-chloro-4,5 - dihydro - pyrazolo(3,4-d)pyrimidine of the formula

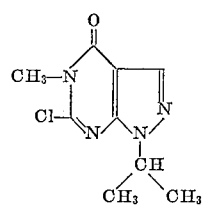

melting at 100–101° C. After recrystallization from petroleum ether the melting point is raised to 103–104° C.

Example 42

4 grams of 1-isopropyl-5-ethyl-4,6-dioxo-4,5,6,7-tetrahydro-pyrazolo(3,4-d)pyrimidine are boiled under reflux with 25 cc. of phosphorus oxychloride for 8 hours. For the purpose of working up, the reaction solution is evaporated in vacuo at a temperature of 60° C. at the most. The residue is poured on to ice, the pH is adjusted to 10 with 2 N-sodium hydroxide solution, and extraction is carried out with ether. From the evaporated ether solution there is obtained 1-isopropyl-4-oxo-5-ethyl-6-chloro-4,5-dihydro-pyrazolo(3,4-d)pyrimidine of the formula

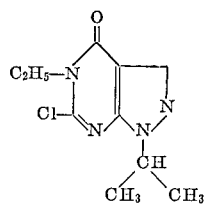

melting at 64–650° C. After recrystallization from petroleum ether, the melting point rises to 65–66° C.

Example 43

4 grams of 2-isopropyl-4,6-dioxo-5-methyl-4,5,6,7-tetrahydro-pyrazolo(3,4-d)pyrimidine are heated at the boil with 50 cc. of phosphorus oxy-chloride. After two hours the substance dissolves, and boiling is continued for another 6 hours. The reaction solution is evaporated in vacuo at a maximum temperature of 50° C. The solution is then adjusted to pH=10 with cooling and extracted with ample ether. From the evaporated ether solution there is obtained 2-isopropyl-4-oxo-5-methyl-6- chloro - 4,5 - dihydro-pyrazolo(3,4-d)pyrimidine of the formula

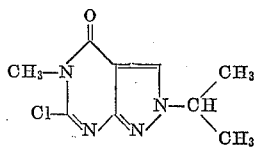

melting at 148–150° C. After recrystallization from ether the substance melts at 150–151° C.

*Example 44*

4 grams of 2,5-dimethyl-4,6-dioxo-4,5,6,7-tetrahydropyrazolo(3,4-d)pyrimidine are boiled under reflux with 130 cc. of phosphorus oxychloride for 19 hours. After cooling, the undissolved starting material is separated off and the filtrate evaporated. The residue is poured on to ice, rendered alkaline with 2 N-sodium hydroxide solution and extracted with chloroform. From the evaporated chloroform solution there is obtained by recrystallization from acetone 2,5-dimethyl-4-oxo-6-chloro-4,5-dihydro-pyrazolo(3,4-d)pyrimidine melting at 199–200° C.

*Example 45*

A methylate solution, prepared from 2.67 grams of sodium in 85 cc. of methanol, is added to 2.3 grams of 1,5 - dimethyl - 4-oxo-6-chloro-4,5-dihydro-pyrazolo(3,4-d)pyrimidine, and the whole is boiled for 1 hour under reflux. The mixture is then evaporated to 30 cc., water is added and the solution is extracted with chloroform. The residue obtained from the evaporated chloroform solution is recrystallized from a mixture of ether and petroleum ether. There is thus obtained 1,5-dimethyl-4-oxo - 6 - methoxy-4,5-dihydro-pyrazolo(3,4-d)pyrimidine of the formula

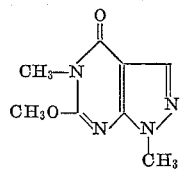

melting at 160–161° C.

*Example 46*

To 2.26 grams of 1-isopropyl-4-oxo-5-methyl-6-chloro-4,5-dihydro-pyrazolo(3,4-d)pyrimidine there is added a sodium methylate solution prepared from 75 cc. of methanol and 2.3 grams of sodium, and the whole is boiled under reflux for 1 hour. The reaction solution is concentrated to 25 cc., diluted with water and extracted with ample chloroform. The residue obtained from the evaporated chloroform solution is recrystallized from a mixture of ether and petroleum ether with the addition of a little alcohol. There is obtained 1-isopropyl-4-oxo-5-methyl-6-methoxy-4,5-dihydro-pyrazolo(3,4 - d)-pyrimidine of the formula

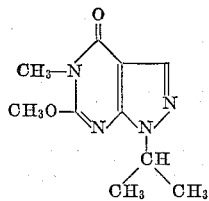

melting at 158–159° C.

*Example 47*

To 2.4 grams of 1-isopropyl-4-oxo-5-ethyl-6-chloro-4,5-dihydro-pyrazolo(3,4-d)pyrimidine there is added a sodium methylate solution prepared from 75 cc. of methanol and 2.3 grams of sodium, and the whole is boiled under reflux for 1 hour. The reaction solution is concentrated to about 25 cc., diluted with water and extracted with chloroform. The residue obtained from the evaporated chloroform solution is recrystallized from petroleum ether. There is obtained 1-isopropyl-4-oxo-5-ethyl-6-methoxy-4,5-dihydropyrazolo(3,4-d)pyrimidine of the formula

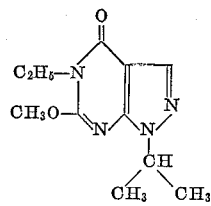

melting at 107.5–108.5° C.

*Example 48*

To 2 grams of 2-isopropyl-4-oxo-5-methyl-6-chloro-4,5-dihydro-pyrazolo(3,4-d)pyrimidine there is added a sodium methylate solution prepared from 2.04 grams of sodium in 65 cc. of methanol, and the whole is boiled for 1 hour under reflux. The reaction solution is concentrated to about 25 cc., diluted with water and extracted with much chloroform. The residue from the evaporated chloroform solution is recrystallized from acetone-petroleum ether. There is obtained 2-isopropyl-4-oxo-5-methyl-6-methoxy-pyrazolo(3,4-d)pyrimidine of the formula

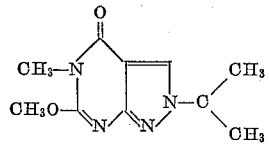

melting at 192–193° C.

*Example 49*

0.8 gram of 2.5-dimethyl-4-oxo-6-chloro-4,5-dihydropyrazolo(3,4-d)pyrimidine is boiled under reflux for 1 hour with a solution of 0.93 gram of sodium in 30 cc. of methanol. The reaction solution is concentrated, diluted with water and extracted with chloroform. From the evaporated chloroform solution there is obtained 2,5-dimethyl - 4 - oxo - 6 - methoxy - 4,5 - dihydro - pyrazolo(3,4-d)pyrimidine which crystallizes from acetone; M.P.=176–177° C.

*Example 50*

20 grams of diethyl sulfate are added to a solution of 8 grams of 2-methyl-4,6-dioxo-4,5,6,7-tetrahydro-pyrazolo(3,4-d)pyrimidine in 60 cc. of 2 N-sodium hydroxide solution, and the whole is stirred while being heated at 95° C. for 4 hours. On cooling, a precipitate is formed which is filtered off and recrystallized from ethanol. There is obtained the 2-methyl-7-ethyl-4,6-dioxo-4,5,6,7-tetrahydropyrazolo(3,4-d)pyrimidine in the form of crystals of melting point 255° C.

*Example 51*

A mixture of 10 grams of 1-(β-hydroxy-ethyl)-3-amino-4-carbethoxy-pyrazole and 20 grams of urea is heated at 180° C. for 6 hours. The solid reaction product is dissolved in 2 N-sodium hydroxide solution, filtered, and the filtrate is given a pH of 1 by adding 2 N-sodium hydroxide solution. On prolonged standing, the 2-(β-hydroxy - ethyl) - 4,6 - dihydroxy - pyrazolo(3,4 - d)pyrimidine separates out. For purification, it is recrystallized from water. Its melting point is at 292° C.

*Example 52*

10 grams of 1-(β-hydroxy-ethyl)-3-amino-4-carbethoxy-pyrazole are heated at 160° C. for 4 hours with 30 cc. of formamide. A crystalline precipitate forms which, for purification, is sublimed at 200° C. under a pressure of 0.05 mm. In this manner there is obtained 2 - (2 - hydroxy - ethyl) - 4 - hydroxy - pyrazolo(3,4-d) pyrimidine in the form of white crystals melting at 269° C.

*Example 53*

A suspension of 10 grams of ethylhydrazine-oxalate in 130 cc. of absolute alcohol is added to 11.25 grams of ethoxy-methylene-cyanacetic ester, dissolved in 30 cc. of absolute alcohol, and the mixture boiled under reflux while being stirred for 10 hours. After cooling, the reaction solution is filtered and the filtrate evaporated. The residue is mixed with 2 N-sodium hydroxide solution and extracted several times with ether. The ethereal solution is evaporated and the residue subjected to fractional distillation under a high vacuum. There is obtained in this manner the 2-ethyl-3-amino-4-carbethoxy-pyrazole which under a pressure of 0.6 mm. boils at 120–121° C.

18.3 grams of 2-ethyl-3-amino-4-carbethoxy-pyrazole and 50 cc. of formamide are heated under a current of nitrogen for 10 hours in an oil bath having a temperature of 200–210° C. Part of the formamide is then evaporated and the reaction mass allowed to cool. The crystals that separate are filtered off, dissolved in 2 N-sodium hydroxide solution, and filtered after the addition of active carbon. The filtrate is given a pH of 3,5 with 5 N-hydrochloric acid, after which the 1-ethyl-4-hydroxy-pyrazolo (3,4-d)pyrimidine separates in the form of white crystals of melting point 236–237° C.

What is claimed is:

1. A member of the group consisting of 4,5,6,7-tetrahydro-pyrazolo(3,4-d)pyrimidines of the formulae:

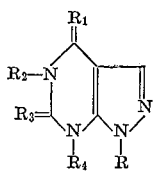

and

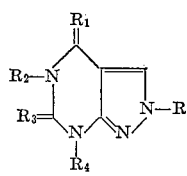

wherein R is a member selected from the group consisting of hydrogen, lower alkyl, hydroxy-lower alkyl, di-lower alkylamino-lower alkyl and cyclo-lower alkyl and $R_2$ and $R_4$ are members selected from the group consisting of lower alkyl, hydroxy: lower alkyl, di-lower alkylamino-lower alkyl and cyclo-lower alkyl and $R_1$ and $R_3$ are members of the group consisting of oxo, imino and thiono, but at least one of these stands for oxo, and their therapeutically useful acid addition salts.

2. A member of the group consisting of dihydro-pyrazolo(3,4-d)pyrimidines of the formulae:

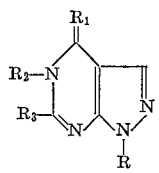

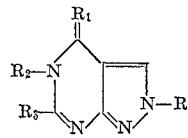

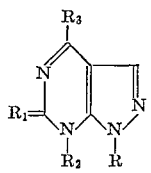

and

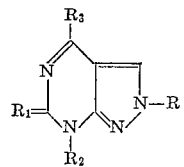

and their tautomeric forms, wherein R is a member selected from the group consisting of lower alkyl, hydrogen, hydroxy-lower alkyl, di-lower alkylamino-lower alkyl and cyclo-lower alkyl, and $R_2$ is a member selected from the group consisting of lower alkyl, hydroxy-lower alkyl, di-lower alkylamino-lower alkyl and cyclo-lower alkyl, and $R_1$ is a member selected from the group consisting of oxo, imino and thiono, and $R_3$ is a member of the group consisting of hydroxy, amino, mercapto, lower alkoxy, lower alkylamino and lower alkylmercapto but at least one of $R_1$ and $R_3$ is a member selected from the group consisting of oxo and hydroxy, and their therapeutically useful acid addition salts.

3. A member of the group consisting of pyrazolo(3,4-d)pyrimidines of the formulae

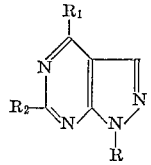

and and their tautomeric forms, wherein R is a member selected from the group consisting of lower alkyl, lower hydroxy-alkyl, lower dialkylamino-lower alkyl and cyclo-lower alkyl and $R_1$ and $R_2$ are members selected from the group consisting of hydroxy, amino, mercapto, lower alkoxy, lower alkylamino and lower alkylmercapto but at least one of these radicals is hydroxy, and their therapeutically useful acid addition salts.

4. 1 - R-5-$R_2$-4,6-dioxo-4,5,6,7-tetrahydro-pyrazolo-(3, 4-d)pyrimidine, wherein R and $R_2$ are lower alkyl having together at least 3 carbon atoms.

5. 1 - methyl - 5-$R_2$-4,6-dioxo-4,5,6,7-tetrahydro-pyrazolo(3,4-d)pyrimidine, wherein $R_2$ is lower alkyl.

6. 2 - methyl - 5-$R_2$-4,6-dioxo-4,5,6,7-tetrahydro-pyrazolo(3,4-d)pyrimidine, wherein $R_2$ is lower alkyl.

7. 1 - methyl - 5-$R_2$-7-$R_4$-4,6-dioxo-4,5,6,7-tetrahydro-pyrazolo(3,4-d)pyrimidine, wherein $R_2$ and $R_4$ are lower alkyl.

8. 2 - methyl - 5-$R_2$-7-$R_4$-4,6-dioxo-4,5,6,7-tetrahydro-pyrazolo(3,4-d)pyrimidine, wherein $R_2$ and $R_4$ are lower alkyl.

9. 1 - isopropyl - 5-$R_2$-4,6-dioxo-4,5,6,7-tetrahydropyrazolo(3,4-d)pyrimidine, wherein $R_2$ is lower alkyl.

10. 1 - $R_1$ - 5 - $R_2$ - 4,6 - dioxo - 4,5,6,7 - tetrahydro-pyrazolo-(3,4-d)pyrimidine, wherein $R_1$ and $R_2$ are lower alkyl, $R_1$ and $R_2$ together having at least 3 carbon atoms.

11. 4,6 - dihydroxy - pyrazolo(3,4 - d)pyrimidine N-substituted in the pyrazole nucleus by lower alkyl.

12. 5 - lower alkyl - 6 - halogeno - 4 - oxo - 4,5 - dihydro-pyrazolo(3,4-d)pyrimidine N-substituted in the pyrazole nucleus by lower alkyl.

13. 5-lower alkyl-6-lower alkoxy-4-oxo-4,5-dihydropyrazolo(3,4-d)pyrimidine N-substituted in the pyrazole nucleus by lower alkyl.

14. 5 - $R_2$ - 4,6 - dioxo - 4,5,6,7 - tetrahydro - pyrazolo(3,4-d)pyrimidine, wherein $R_2$ is lower alkyl, and which is N-substituted in the pyrazole ring by lower alkyl.

15. 1,5,7-trimethyl-4,6-dioxo-4,5,6,7-tetrahydropyrazolo(3,4-d)pyrimidine.

16. 2,5,7-trimethyl-4,6-dioxo-4,5,6,7-tetrahydropyrazolo(3,4-d)pyrimidine.

17. 1-isopropyl-5,7-dimethyl-4,6-dioxo-4,5,6,7-tetrahydropyrazolo(3,4-d)pyrimidine.

18. 1-isopropyl-4,6-dihydroxy-pyrazolo(3,4-d)pyrimidine.

19. 2,5,7-triethyl-4,6-dioxo-4,5,6,7-tetrahydropyrazolo(3,4-d)pyrimidine.

20. 5,7-diethyl-4,6-dioxo-pyrazolo(3,4-d)pyrimidine.

21. 1-cyclohexyl-4,6-dioxy-pyrazolo(3,4-d)pyrimidine.

22. 1-secondary butyl-4,6-dioxy-pyrazolo(3,4-d)pyrimidine.

23. 1-methyl-4,6-dihydroxy-pyrazolo(3,4-d)pyrimidine.

24. 1-isopropyl-4,6-dioxo-5-methyl-4,5,6,7-tetrahydropyrazolo(3,4-d)pyrimidine.

References Cited in the file of this patent

FOREIGN PATENTS 716,327     Great Britain _____ Oct. 6, 1954

OTHER REFERENCES

Justoni et al., Chem. Abstracts, volume 32, column 6244 (1938).

Rose, Jour. Chem. Soc. (London), pages 3444–3454 (1952).

American Chemical Society Abstracts (1955), 128th Meeting, pages 11N–13N.

Skipper et al., "Society for Experimental Biology and Medicine, Proceedings," volume 89, pages 594–596 (1955).

Robins, Jour Amer. Chem. Soc., volume 78, pages 784–788 (1956).

Falco et al., Jour. Amer. Chem. Soc., volume 78, pages 3143–3145 (1956).

Cheng et al., Jour. of Organic Chemistry, volume 23, pages 191–196 (1958).